Patented Feb. 16, 1932

1,845,198

UNITED STATES PATENT OFFICE

OTTO SCHMIDT, OF LUDWIGSHAFEN-ON-THE-RHINE, AND EGON MEYER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF RESINOUS PRODUCTS

No Drawing. Application filed December 1, 1928, Serial No. 323,196, and in Germany February 2, 1927.

The present invention relates to the manufacture of resinous products.

It is already known that more or less water-soluble resinous bodies can be obtained from dibasic organic acids and polyhydric alcohols. These bodies and also those hitherto prepared from other high molecular acids show the drawback that they still possess a rather high acid value which makes them inapplicable for many industrial purposes.

We have now found that very valuable resinous water-insoluble products are obtained by allowing alkylene monoxids to react with high molecular resinous acid substances at a temperature such as from about 60° to about 200° C. and if desired, in the presence of condensing agents, which preferably are more or less acid, such as boric or sulfuric acid, but for which purpose also alcoholic soda or potash may be employed. The term "high molecular resinous acid substances" is meant to comprise acid reacting natural resins or gums and the free acids contained therein, the so-called resinic acids such as abietic acid, or the aleuritic acid of shellac, and also acid reacting artificial resins, such as the condensation products of organic mono- or dicarboxylic acids with formaldehyde or with polyhydric alcohols or substances acting like these which products still contain free carboxylic groups. Especially the last mentioned acid condensation products are appreciably improved by a subsequent treatment with alkylene monoxids. The reaction may be carried out with the components in the dissolved or molten state, advantageously in a closed vessel, whereby a pressure corresponding to the vapor tension of the materials employed at the temperature chosen is produced. Condensing agents which possess also a water removing action, such as zinc chlorid, and the like, may also be employed, and the reaction products thus obtained can be subjected to an after-treatment, for example by heating in vacuo, or in any other suitable manner by which treatment, for example, remainders of the alkylene oxids can be expelled.

The resinous initial materials may be derived from a condensation of the following polybasic acids, which, however, are mentioned only by way of example: phthalic acid, succinic acid, citric acid, tartaric acid and sebacic acid with polyhydric alcohols or of a condensaton of hydroxybenzoic acids with formaldehyde. The following monobasic acids can be directly employed: abietic acid, palmitic acid and stearic acid or the acids obtainable from their esters contained in copals, shellac or other natural resins, which acids can also be employed in the form of their anhydrids.

By the action of alkylene oxids on abietic acid, for example, well characterized esters of abietic acid which contain hydroxyl groups are obtained, which are themselves, as well as their ethers and esters, adapted for employment for a great variety of purposes in the lacquer and varnish industries, for cosmetic purposes, as softening agents for artificial substances and films comprising cellulose esters or ethers or for artificial masses consisting of resinous substances which can be hardened, and also for impregnating purposes or in the production of sealing wax, and the like.

Moreover, a treatment with alkylene monoxids, for example ethylene oxid, for an improvement of ester gums is very advantageous. By a subsequent treatment with ethylene oxid and without further treatment, the ester gums already known, for example those obtained from colophony and glycerol, or from phthalic anhydrid and glycerol, can be converted into resins free from or only containing very small quantities of free acid.

The products obtained may be acylated, if desired, for example with acetic anhydrid, formic acid or phthalic anhydrid.

The following examples will further illustrate the nature of the said invention but the invention is not restricted to these examples. The parts are by weight.

*Example 1*

600 parts of colophony having an acid value of 170 are heated at from 160° to 170° C. for several hours under pressure together with 150 parts of ethylene oxid, while stirring. After removing the excess of ethylene oxid, the reaction product is obtained in the form of a pale balsam-like soft resin having an acid value of from 5 to 6. It is soluble in many organic solvents and in consequence of its valuable properties can be employed for a great variety of purposes.

When this product is treated with acetic anhydrid the acetyl compound is obtained, which is also a balsam-like resin.

*Example 2*

1000 parts of an ester gum which has been prepared in the usual manner from colophony and glycerol and which has an acid value of 15, are heated to 140° C. for from 4 to 5 hours with 25 parts of ethylene oxid in an autoclave fitted with a stirring device.

The resin obtained in this manner has all the commercially valuable properties of the common ester gum, but the acid value is decreased to from 1 to 1.5.

*Example 3*

444 parts of phthalic anhydrid and 184 parts of glycerol are converted in the usual manner into a hard, fusible resin, the acid number of which is still 130 to 135. 500 parts of this resin are heated with 140 parts of ethylene oxid for 6 hours to from 140° to 150° C. in an autoclave. The reaction product which can be further purified by redissolution in methanol and a treatment with animal charcoal, is a nearly colorless, clear and highly viscous balsam possessing a very high sticking power and growing semi-solid on standing. The resin has an acid number which is practically zero and is soluble in many organic solvents but insoluble in water.

*Example 4*

300 parts of French colophony, 110 parts of propylene oxid and 3 parts of boric acid are heated in a rotating autoclave at 150° C. for 8 hours. After the reaction, the remainders of propylene oxid are removed by heating, whereafter the reaction product is obtained as a brownish, balsam-like soft resin which is soluble in most of the organic solvents and has an acid value of from 7 to 9.

*Example 5*

300 parts of shellac, the acid value of which is 55, are treated with 90 parts of ethylene oxid in the manner described in the foregoing example, whereby 350 parts of a viscous, gummy, soft, dark-colored resin are obtained which liquefies by heating on the water-bath and has an acid value of as low as 3.6.

*Example 6*

200 parts of a colorless very hard resin having the acid value of 356, which is prepared by boiling salicylic acid and formaldehyde with water, are heated with 180 parts of ethylene oxid at 140° C. for several hours in a pressure-tight vessel. A light brownish, clear balsam is obtained, the acid value of which is only 54.

What we claim is:—

1. The process for the manufacture of resinous products which comprises acting with an α-alkylene monoxid at a temperature between about 60° and about 200° C. on a resinous acid substance.

2. The process for the manufacture of resinous products which comprises acting with an α-alkylene monoxid at a temperature between about 60° and about 200° C. on a resinous acid substance in the presence of a condensing agent capable of yielding with water a hydrogen-ion concentration different from the neutral point.

3. The process for the manufacture of resinous products which comprises acting with an α-alkylene monoxid at a temperature between about 60° and about 200° C. on a resinous acid substance in the presence of an acid condensing agent.

4. The process for the manufacture of resinous products which comprises acting with an α-alkylene monoxid at a temperature between about 60° and about 200° C. on an organic carboxylic acid of resinous nature.

5. The process for the manufacture of resinous products which comprises acting with an α-alkylene monoxid at a temperature between about 60° and about 200° C. on a resinic acid.

6. The process for the manufacture of resinous products which comprises acting with an α-alkylene monoxid at a temperature between about 60° and about 200° on colophony.

7. The process for the manufacture of resinous products which comprises acting with an α-alkylene monoxid at a temperature between 140° and 170° centigrade on a resinous acid substance.

8. The process for the manufacture of resinous products which comprises acting with an α-alkylene monoxid at a temperature between 140° and 170° centigrade on a resinous acid substance in the presence of a condensing agent capable of yielding with water a hydrogen-ion concentration different from the neutral point.

9. The process for the manufacture of resinous products which comprises acting with ethylene oxid at a temperature between about 60° and about 200° centigrade on a resinous acid substance.

10. The process for the manufacture of resinous products which comprises acting with propylene oxid at a temperature between about 60° and about 200° centigrade on a resinous acid substance.

11. The process for the manufacture of resinous products which comprises acting with ethylene oxid at a temperature between about 60° and about 200° centigrade on a resinous acid substance in the presence of a condensing agent capable of yielding with water a hydrogen-ion concentration different from the neutral point.

12. The process for the manufacture of resinous products which comprises acting with an α-alkylene monoxid at a temperature between about 60° and about 200° centigrade on colophony.

13. The process for the manufacture of resinous products which comprises acting with an α-alkylene monoxid at a temperature between about 60° and about 200° centigrade on shellac.

14. The process for the manufacture of resinous products which comprises acting with ethylene oxid at a temperature between 160° and 170° centigrade on colophony.

15. The process for the manufacture of resinous products which comprises acting with propylene oxid at about 150° centigrade on colophony.

16. The process for the manufacture of resinous products which comprises acting with ethylene oxid at about 150° centigrade on shellac.

In testimony whereof we have hereunto set our hands.

OTTO SCHMIDT.
EGON MEYER.